United States Patent
Stjernholm

(10) Patent No.: US 10,667,201 B2
(45) Date of Patent: May 26, 2020

(54) SELECTIVE ACCESS INFORMATION BROADCAST IN OVERLAPPING SERVICE AREAS

(71) Applicant: Telefonaktiebolaget LM Ericsson (publ), Stockholm (SE)

(72) Inventor: Paul Stjernholm, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/081,882

(22) PCT Filed: Mar. 11, 2016

(86) PCT No.: PCT/SE2016/050197
§ 371 (c)(1),
(2) Date: Aug. 31, 2018

(87) PCT Pub. No.: WO2017/155439
PCT Pub. Date: Sep. 14, 2017

(65) Prior Publication Data
US 2019/0069219 A1    Feb. 28, 2019

(51) Int. Cl.
*H04W 48/10*    (2009.01)
*H04W 48/02*    (2009.01)
(Continued)

(52) U.S. Cl.
CPC ........ *H04W 48/10* (2013.01); *H04W 24/10* (2013.01); *H04W 48/02* (2013.01); *H04W 48/12* (2013.01);
(Continued)

(58) Field of Classification Search
CPC ..... H04W 16/14; H04W 24/10; H04W 48/02; H04W 48/10
See application file for complete search history.

(56) References Cited

U.S. PATENT DOCUMENTS

2011/0263250 A1    10/2011   Mueck et al.
2012/0064930 A1*    3/2012   Kronander ............ H04W 48/10
                                                                 455/509
(Continued)

FOREIGN PATENT DOCUMENTS

EP    2747490 A1    6/2014
EP    2673994 B1    3/2015
(Continued)

OTHER PUBLICATIONS

International Search Report and Written Opinion for Application No. PCT/SE2016/050197, dated Nov. 7, 2016, 11 pages.
(Continued)

*Primary Examiner* — Walli Z Butt
*Assistant Examiner* — Ryan C Kavleski
(74) *Attorney, Agent, or Firm* — NDWE LLP

(57) ABSTRACT

A method performed by a network node for handling communication in a communication network, the communication network comprises a radio network node providing radio coverage over a second service area and an access node providing radio coverage over a first service area. The network node determines that the first service area covers the second service area, and in that case requests the access node to broadcast access information for the second service area.

32 Claims, 9 Drawing Sheets

(51) Int. Cl.
  *H04W 48/12* (2009.01)
  *H04W 24/10* (2009.01)
  *H04W 48/14* (2009.01)
  *H04W 16/14* (2009.01)
  *H04W 24/02* (2009.01)

(52) U.S. Cl.
  CPC ............ *H04W 48/14* (2013.01); *H04W 16/14* (2013.01); *H04W 24/02* (2013.01)

(56) References Cited

U.S. PATENT DOCUMENTS

| | | | | |
|---|---|---|---|---|
| 2012/0202558 A1* | 8/2012 | Hedberg | ................ | H04L 5/0058 455/550.1 |
| 2013/0023301 A1* | 1/2013 | Wang | .................... | H04W 92/20 455/525 |
| 2014/0004841 A1* | 1/2014 | Morad | .................. | H04W 24/08 455/418 |
| 2015/0146645 A1* | 5/2015 | Sergeyev | .............. | H04L 5/0032 370/329 |
| 2017/0208539 A1* | 7/2017 | Brisebois | .............. | H04W 24/10 |
| 2018/0255503 A1* | 9/2018 | Karlsson | ............... | H04W 48/10 |

FOREIGN PATENT DOCUMENTS

| | | | |
|---|---|---|---|
| WO | | 2014096955 A1 | 6/2014 |
| WO | | 2015081248 A1 | 6/2015 |
| WO | WO 2015081248 | * | 6/2015 |
| WO | | 2016009983 A1 | 1/2016 |

OTHER PUBLICATIONS

Communication pursuant to Article 94(3) EPC for Application No. 16714045.8, dated Aug. 2, 2019, 20 pages.

International Preliminary Report on Patentability for Application No. PCT/SE2016/050197, dated Sep. 20, 2018, 9 pages.

Communication pursuant to Article 94(3) EPC, EP App. No. 16714045. 8, dated Feb. 20, 2020, 8 pages.

* cited by examiner

SELECTIVE ACCESS INFORMATION BROADCAST IN OVERLAPPING SERVICE AREAS

CROSS-REFERENCE TO RELATED APPLICATIONS

This application is a National stage of International Application No. PCT/SE2016/050197, filed Mar. 11, 2016, which is hereby incorporated by reference.

TECHNICAL FIELD

Embodiments herein relate to a network node, an access node and methods performed therein regarding wireless communication. Furthermore, a computer program and a computer readable storage medium are also provided herein. In particular, embodiments herein relate to handle communication in a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into areas or cell areas, with each area or cell area being served by an access node e.g., a Wi-Fi access point or a radio base station (RBS), which in some networks may also be called, for example, a "NodeB" or "eNodeB". The area or cell area is a geographical area where radio coverage is provided by the access node. The access node communicates over an air interface operating on radio frequencies with the wireless device within range of the access node. The access node communicates over a downlink (DL) to the wireless device and the wireless device communicates over an uplink (UL) to the access node.

A Universal Mobile Telecommunications System (UMTS), comprising the UMTS terrestrial radio access network (UTRAN), is a third generation telecommunication network, which evolved from the second generation (2G) Global System for Mobile Communications (GSM). In a forum known as the Third Generation Partnership Project (3GPP), telecommunications suppliers propose and agree upon standards for third generation networks and UTRAN specifically, and investigate enhanced data rate and radio capacity. In some RANs, e.g. as in UTRAN, several access nodes may be connected, e.g., by landlines or microwave, to a controller node, such as a radio network controller (RNC), which supervises and coordinates various activities of the plural access nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

The 3GPP is and has been working on standardization of the Long Term Evolution (LTE) concept. The architecture of the LTE system is shown in FIG. 1a, including access nodes, denoted as eNBs, of the E-UTRAN, and evolved packet core nodes such as MME/S-GWs. As it can be seen, an S1 interface connects eNBs to the MME/S-GW, while an X2 interface connects peer eNBs.

In existing communication networks, like LTE, system information is broadcasted by each cell containing information on how to access the network. The wireless devices download System Information Blocks (SIB) from the Downlink Shared Channel (DL-SCH), where SIB2 contains parameters needed for initial access transmission containing System information-Radio Network Temporary Identifier (SI-RNTI), Root sequence index, Zero correlation zone configuration, Physical Random Access Channel (PRACH) frequency, and PRACH frequency offset, all used by the wireless device to access the cell. The Root sequence index and the Zero correlation zone configuration are, together with the Physical Cell Index (PCI), parameters that need to be planned for optimal performance of the access to the LTE network. This could be done manually or be automated.

FIG. 1b shows a possible 5G mobility concept. A set of Access Information (AI), such as an access information list or a table with access information, comprises information necessary to access the network. The access information may comprises information such as identity of Public Land Mobile Network (PLMN), power settings, physical resource barring info etc. and may be transmitted with a periodicity e.g. 10 s or 24 s. An access node, also referred to as network node, may provide service coverage over a geographical area herein denoted service area. Multiple Access Nodes (AN), also referred to as network nodes, may comprise the same AI and each service area is associated with one or more System Identities (SID) e.g. a system signature indication indicating e.g. identity of a Transmission (TX) antenna of the access node. For example, a first small access node may be associated with a first SID, e.g. '1'; a second small access node may be associated with a second SID, e.g. '2'; a third small access node may be associated with a third SID, e.g. '3'; a fourth small access node may be associated with the second and third SID, e.g. '2'+'3', of different antennas. The SID is used by the wireless device to find the system and a SID value may map to an entry in the table or list of access information (AI). SID is transmitted e.g. every 100 ms, and to be energy efficient the network nodes may broadcast the AI rather infrequent, e.g. with an interval of around 10 seconds. Broadcasting AI from all antennas in every service area generates a processing overhead in the network and interference in the downlink.

SUMMARY

An object of embodiments herein is to provide a mechanism that improves performance of the communication network.

According to an aspect of embodiments herein the object is achieved by a method performed by a network node for handling communication in a communication network. The communication network comprises a radio network node providing radio coverage over a second service area and an access node providing radio coverage over a first service area. The network node, being the radio network node or a managing node in the communication network, determines that the first service area covers the second service area, and in that case the network node requests the access node to broadcast access information for the second service area.

According to another aspect of embodiments herein the object is achieved by a method performed by an access node for handling communication in a communication network. The communication network comprises a radio network node providing radio coverage over a second service area and the access node providing radio coverage over a first service area. The access node receives a request, from the radio network node, requesting the access node to broadcast access information for the second service area, and broadcasts the access information for the second service area.

According to yet another aspect of embodiments herein the object is achieved by providing a network node for handling communication in a communication network. The communication network comprises a radio network node providing radio coverage over a second service area and an access node providing radio coverage over a first service area. The network node is configured to determine that the first service area covers the second service area; and in that case configured to request the access node to broadcast access information for the second service area.

According to still another aspect of embodiments herein the object is achieved by providing an access node for handling communication in a communication network. The communication network comprises a radio network node providing radio coverage over a second service area and the access node providing radio coverage over a first service area. The access node is configured to receive a request, from the radio network node, requesting the access node to broadcast access information for the second service area, and to broadcast the access information for the second service area.

It is furthermore provided herein a computer program comprising instructions, which, when executed on at least one processor, cause the at least one processor to carry out any of the methods above, as performed by the network node or the access node. It is additionally provided herein a computer-readable storage medium, having stored thereon a computer program comprising instructions which, when executed on at least one processor, cause the at least one processor to carry out the method according to any of the methods above, as performed by the network node, or the access node.

Advantage of embodiments herein is that access to the network node is efficiently enabled in the communication network since the access information of the second service area is broadcasted by the access node when the first service area covers the second service area. This results in a reduced signalling overhead and interferences in DL resulting in an improved performance of the communication network.

BRIEF DESCRIPTION OF THE DRAWINGS

Embodiments will now be described in more detail in relation to the enclosed drawings, in which.

DETAILED DESCRIPTION

Figure 1A:
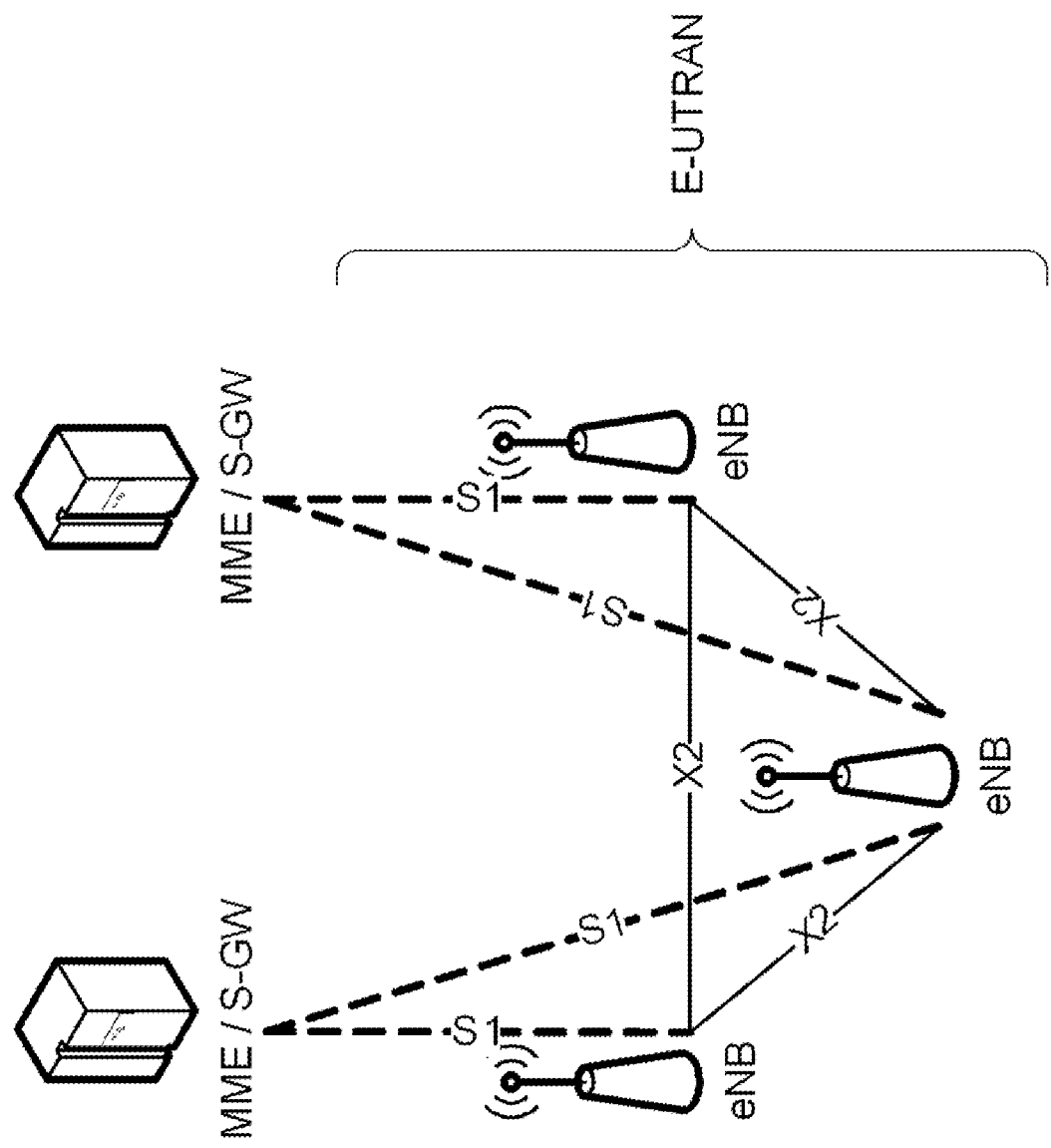
FIG. 1a is a schematic overview depicting LTE architecture showing logical interfaces between eNBs (X2) and between eNB and MME/S-GW according to prior art.
Figure 1B:
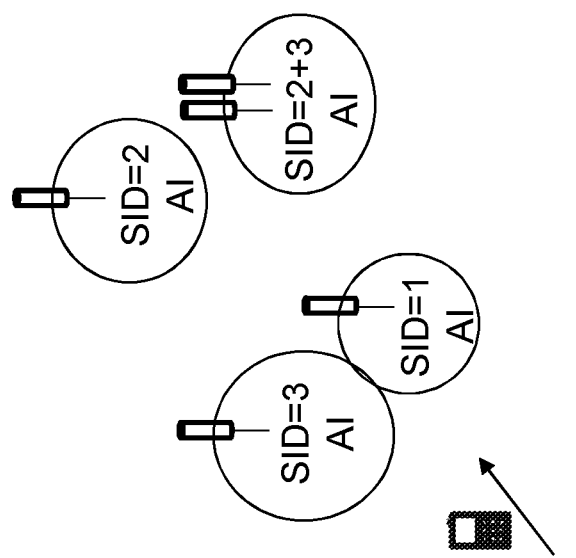
FIG. 1b is a schematic overview depicting a communication network providing spotty coverage deploying one or more SID per node.
Figure 2:
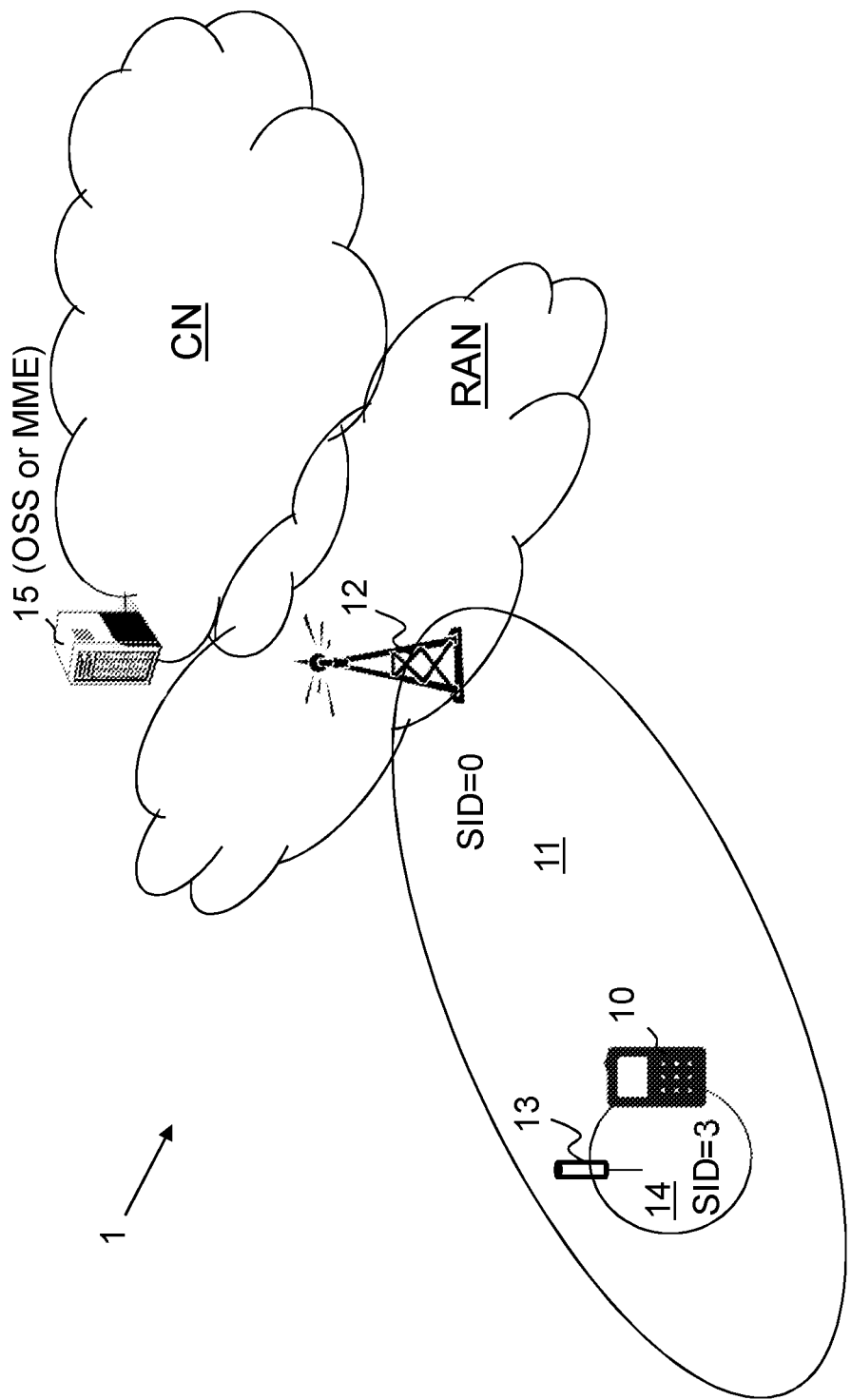
FIG. 2 is a schematic overview depicting a communication network according to embodiments herein.

Embodiments herein relate to communication networks in general. Communication network may also be referred to as wireless communication network or radio communications network. FIG. 2 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WMax), or Ultra Mobile Broadband (UMB), just to mention a few possible implementations. Embodiments herein relate to recent technology trends that are of particular interest in a 5G context, however, embodiments are also applicable in further development of the existing communication systems such as e.g. WCDMA and LTE.

In the communication network 1, wireless devices e.g. a wireless device 10 such as a mobile station, a non-access points (non-AP) STA, a STA, a user equipment and/or a wireless terminal, communicate via one or more Access Networks (AN), e.g. a RAN, to one or more CNs. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The communication network 1 comprises an access node 12 providing radio coverage over a geographical area, a first service area 11 or first cell, of a first radio access technology (RAT), such as LTE, UMTS or similar. It should be understood that one or multiple antenna beams combined may provide coverage of an antenna transmission point, or a service area. Multiple antenna transmission points may also combined form a service area or a cell. The access node 12 may be a transmission and reception point e.g. a radio network node such as, a base station, e.g. a radio base station such as a NodeB, an evolved Node B (eNB, eNode B), a base transceiver station, a radio remote unit, a Wireless Local Area Network (WLAN) access point or an Access Point Station (AP STA), an access controller an Access Point Base Station, a base station router, a transmission arrangement of a radio base station, a stand-alone access point or any other network unit capable of communicating with a wireless device within the area served by the access node 12 depending e.g. on the first radio access technology and terminology used. The access node 12 may be referred to as a serving access node or macro node and may communicate with the wireless devices with DL transmissions to the wireless devices and UL transmissions from the wireless devices. The access node 12 may associated with a first SID e.g. SID=0 and is exemplified herein as a 5G access node. The first SID is a signal for indicating identity of the access node e.g. a Transmission (TX) antenna of the access node 12.

Furthermore, the communication network 1 comprises a radio network node 13 providing radio coverage over a geographical area, a second service area 14 or second cell, of a second RAT, such as 5G, Wi-Fi, WiMAX, LTE or similar. The first and second RATs may be the same or different RATs. The radio network node 13 may be a transmission and reception point e.g. a WLAN access point or an Access Point Station (AP STA), an access controller, an access node, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the radio network node 13 depending e.g. on the second radio access technology and terminology used. The radio network node 13 is associated with a second SID e.g. SID=3 and is exemplified herein as a 5G network node.

The access node 12 may communicate with the radio network node 13 in the communication network 1. This is done by communicating with one another over e.g. a backhaul connection, e.g. an X2 connection, an S1 connection, a combination of an X2 and S1 connection or similar, between the access node 12 and the radio network node 13.

Furthermore, the communication network 1 may comprise a managing node 15, e.g. an Operation Support System (OSS) node, a core network node such as a Mobility Managing Entity (MME), or similar. It should here be noted that the managing node 15 and the radio network node 13 are commonly referred to herein as a network node.

As stated above broadcasting access information from every service area generates a processing overhead in the communication network and may cause interference in the downlink. Embodiments herein provide an efficient solution where it is determined to broadcast access information of the second service area 14 within the first service area 11 when the first service area 11 covers the second service area 14. This enables a leaner system information (SI) concept for e.g. the next generation 5G Radio Access Network avoiding the need for planning. Hence, access information of the second service area 14 is broadcasted by the access node 12 when the first service area 11 covers the second service area 14 and this results in a reduced signalling overhead and an improved performance of the communication network. Furthermore, a wireless device that receives the access information regarding service areas within the first service area 11 already when entering the first service area 11, is enabled to quickly detect the second service area and connect and use the second service area 14 when rapidly passing by and this results in an improved performance of the communication network.

Figure 3:
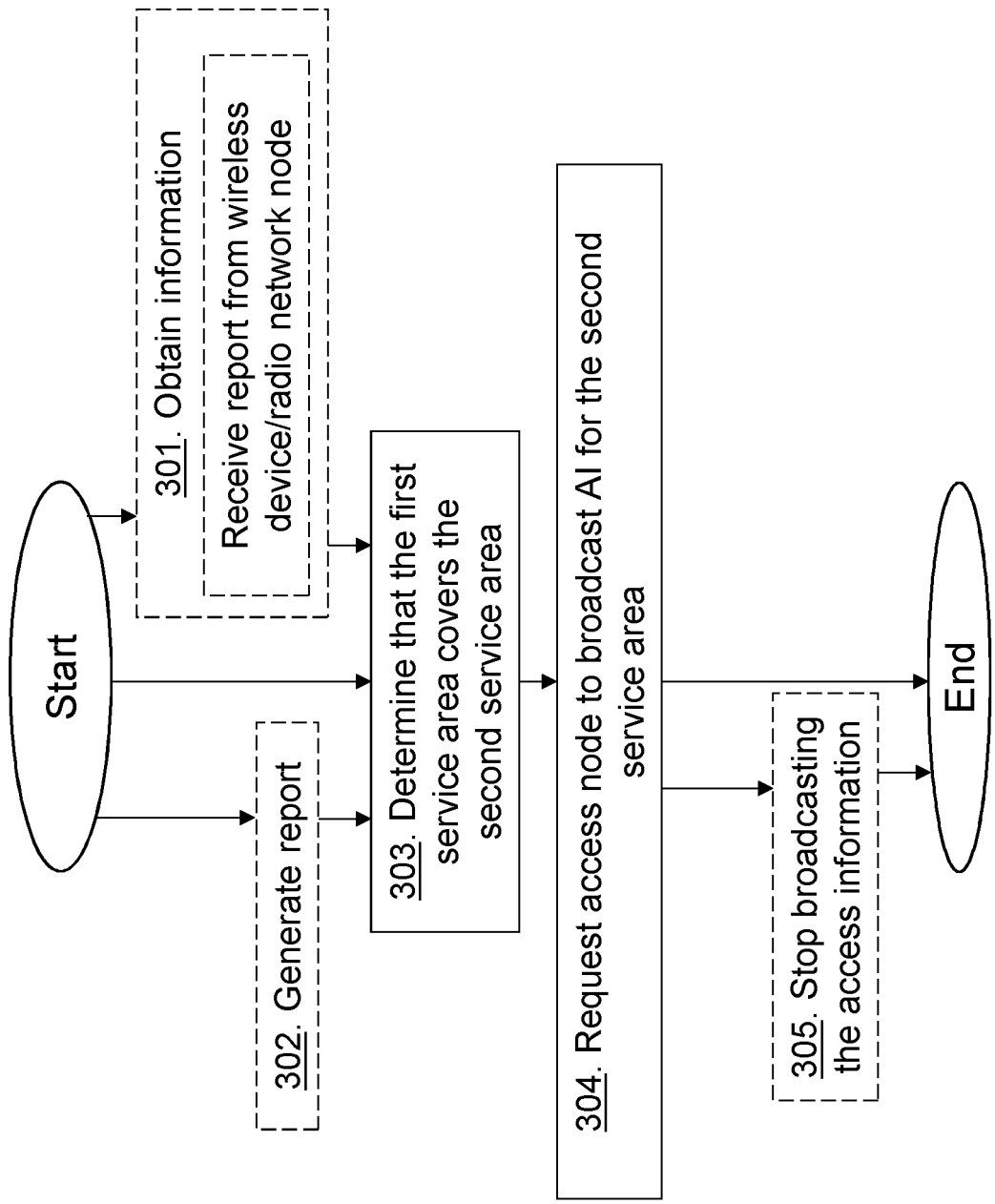
FIG. 3 is a schematic flowchart depicting a method performed by a network node according to embodiments herein.

The method actions performed by the network node, exemplified herein as the radio network node 13 or the managing node 15, for handling communication in the communication network 1 according to some embodiments will now be described with reference to a flowchart depicted in FIG. 3. The actions do not have to be taken in the order stated below, but may be taken in any suitable order. Actions performed in some embodiments are marked with dashed boxes. As stated above the communication network 1 comprises the radio network node 13 providing the radio coverage over the second service area 14 and the access node 12 providing radio coverage over the first service area 11.

Action 301. The network node may obtain information indicating that the first service area 11 covers the second service area 14. This information may be signaling measurements, measuring reports, mobility event reports, or similar. The network node may, e.g. when being the radio network node 13, obtain the information by measuring signals and/or mobility events indicating how much the first service area 11 overlaps the second service area 14 from a traffic point of view e.g. by indicating presence of the first service area 11. The network node may, e.g. when being the managing node 15, obtain the information by receiving one or more reports, e.g. from the radio network node 13 and/or the access node 12, indicating how much the first service area 11 overlaps the second service area 14 from a traffic point of view e.g. indicating a magnitude of the second service area 14 in relation to the first service area 11 such as an amount of traffic in the second service 14 area that also could be served by the first service area 11. When the network node is the radio network node 13, the one or more reports, e.g. UL reports, may be received from the access node 12 and/or the managing node 15. The network node, e.g. the radio network node 13, may transmit a first signalling request, to the access node 12, requesting the access node 12 to transmit an at least temporarily and locally unique reference signal over the first service area 11. The network node may then obtain the information from reports or signalling measurements of the at least temporarily and locally unique reference signal. The network node, e.g. the radio network node 13, may transmit a second signalling request, to the access node 12, requesting the access node 12 to measure on an at least temporarily and locally unique reference signal transmitted by the wireless device 10, or a plurality of wireless devices, in the second service area 14. The network node may then obtain the information from reports of the at least temporarily and locally unique reference signal.

Action 302. The network node may generate a report with information indicating how much the first service area 11 covers the second service area 14, e.g. the radio network node 13 may receive measurements from the wireless device 10 indicating that the first service area 11 covers the second service area 14, the radio network node 13 then generates a report indicating this and send it to the managing node 15.

Action 303. The network node determines that the first service area 11 covers the second service area 14. According to embodiments herein it is determined that the first service area 11 covers the second service area 14 when one or more conditions are fulfilled. The one or more conditions may be related to mobility events and/or measurement of signals indicating a relationship between the first and second service areas. The one or more conditions comprise one or more of the following:

when a statistically significant number of mobility events, in the second service area 14 to/from the first service area 11 is above an event threshold, e.g. when a statistically significant number of mobility events, e.g. handovers or cell reselections, in the second service area to/from the first service area is above the event threshold, e.g. all present HOs or almost all are successful, or all mobility event goes to only the access node 12 and no other network/access nodes;

when a statistically significant number of measurements of signals from one or more wireless devices in the second service area 14, received by the access node 12, is above a uplink threshold, e.g. when a statistically significant number is reached of uplink measurements by the access node 12 on signals from wireless devices associated to the second service area and may require some logic in the OSS node;

when a statistically significant number of measurements of signals from the access node 12, received by one or more wireless devices in the second service area 14, is above a downlink threshold, e.g. when a statistically significant number is reached of downlink measurements of signals from the first service area 11, received in the second service area 14, is above the downlink threshold. E.g. when the statistically significant number of wireless devices within the second service area 14 that have detected the first service area 11 is above the downlink threshold, e.g. when 95% of the wireless devices have detected the first service area 11.

The statistically significant number may be a percentage out of all wireless devices, measurements, or mobility events associated with the second service area 14, e.g. 95% or higher.

Action 304. In case the network node has determined that the first service area 11 covers the second service area 14, the network node requests the access node 12 to broadcast the access information for the second service area 14. For example, the network node may transmit a request to the access node 12 requesting to broadcast the access information, wherein the access information may be comprised in the request.

Action 305. The network node may stop broadcasting the access information within the second service area 14 when receiving an indication of confirmation that the access node 12 is broadcasting the access information of the second service area 14. E.g. the network node may cease broadcasting the access information when receiving a confirmation message of the request transmitted.

Figure 4:
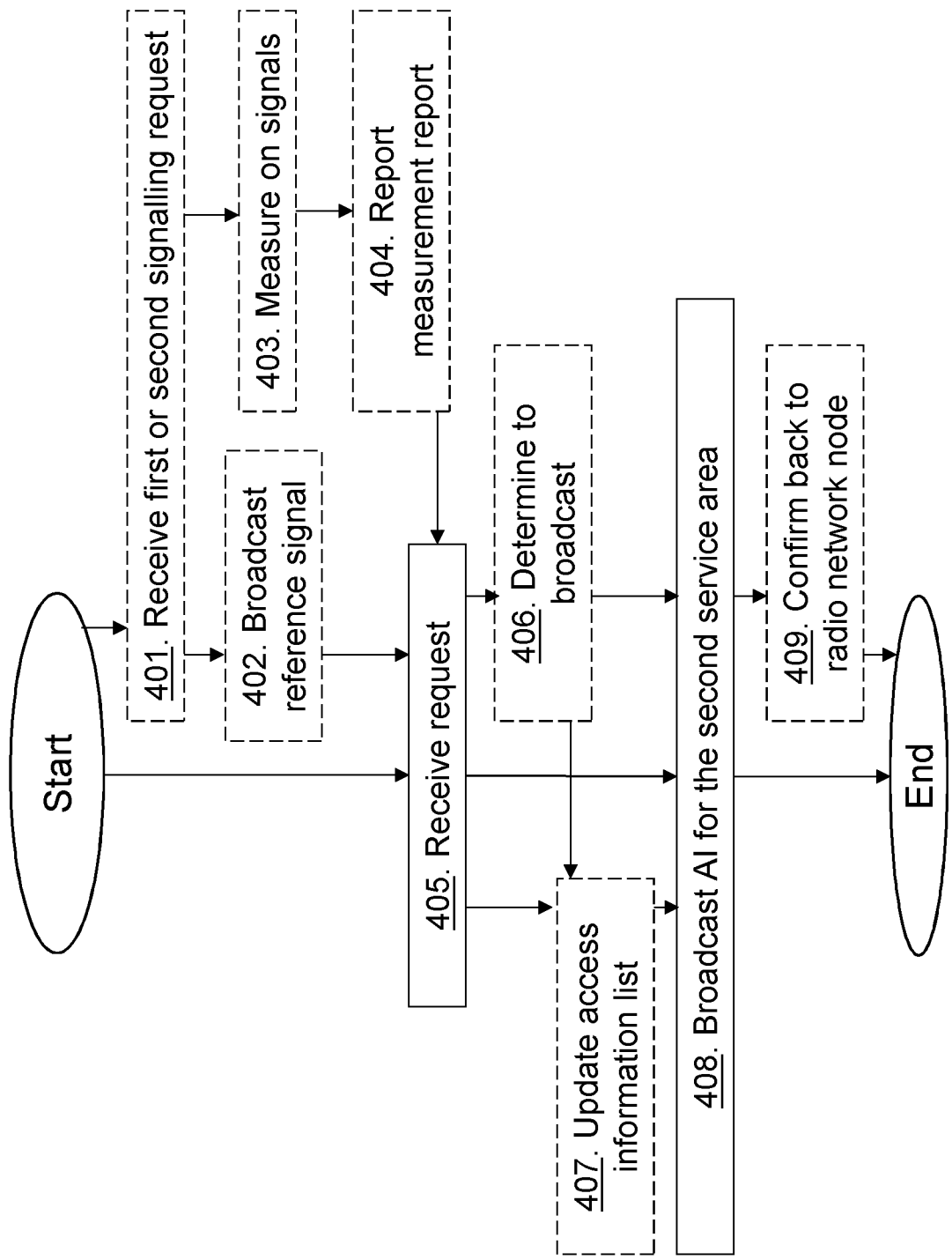
FIG. 4 is a schematic flowchart depicting a method performed by an access node according to embodiments herein.

The method actions performed by the access node 12 for handling communication in the communication network 1 according to one embodiment will now be described with reference to a flowchart depicted in FIG. 4. The actions do not have to be taken in the order stated below, but may be taken in any suitable order. Actions performed in some embodiments are marked with dashed boxes. As previously stated above, the communication network 1 comprises the radio network node 13 providing radio coverage over the second service area 14 and the access node 12 providing radio coverage over the first service area 11.

Action 401. The access node 12 may receive the first signaling request, from the radio network node 13, requesting the access node 12 to transmit an at least temporarily and locally unique reference signal. The access node may alternatively receive the second signaling request, from the radio network node 13, requesting the access node 12 to measure on an at least temporarily and locally unique reference signal transmitted by the wireless device 10, or a plurality of wireless devices, in the second service area 14.

Action 402. The access node 12 may then broadcast the at least temporarily and locally unique reference signal over the first service area 11.

Action 403. Alternatively, the access node 12 may measure on the at least temporarily and locally unique reference signal.

Action 404. The access node 12 may then report a measurement report, e.g. to the access node 12 and/or the managing node 15. The measurement report comprises a result of the measuring in action 403.

Action 405. The access node 12 receives the request requesting the access node 12 to broadcast the access information for the second service area 14. This may be received from the radio network node 13 or the managing node 15.

Action 406. The access node 12 may determine to broadcast the access information for the second service area 14. E.g. the access node 12 may decide whether to broadcast or not based on a parameter such as load in the service area, length of access information list, or similar.

Action 407. The access node 12 may then update an access information list or an access information table with the access information of the second service area 14. This being the case when the access information in not present in the current access information list/table.

Action 408. The access node 12 broadcasts the access information for the second service area 14. When the access node 12 updates the access information list, the access node 12 may broadcast the updated access information list.

Action 409. The access node 12 may confirm back to the radio network node 13 that the access node 12 transmits the access information for the second service area 14. E.g. may transmit an acknowledgement to the requesting network node.

For a next generation 5G radio access network a lean system information handling is discussed. Here the system information could be broadcasted as an Access Information list from all or a subset of the antenna transmission points, or service areas. Each antenna transmission point, or service area, will also broadcast a small SID providing a list entry into the access information list. The access information list comprises the access information required by the wireless device 10 to access an antenna transmission point, or service area, transmitting a certain SID. Embodiments herein automate the selection of the antenna transmission point or service area for the access information list. The radio network node 13 may be by default configured to broadcast its own access information list and based on wireless device measurements, network measurements, mobility events, or a combination thereof, decide to let the access node 12 broadcast the access information list, or let the access node 12 accept to broadcast an access information containing SID entries of other network nodes. The node broadcasting the access information list may be a 5G radio node or an evolved LTE radio node or similar. Embodiments herein avoid a pre-configuration of the access information transmission point or service area, facilitating the deployment and configuration of new network nodes in e.g. a 5G network or evolved LTE network.

Figure 5:
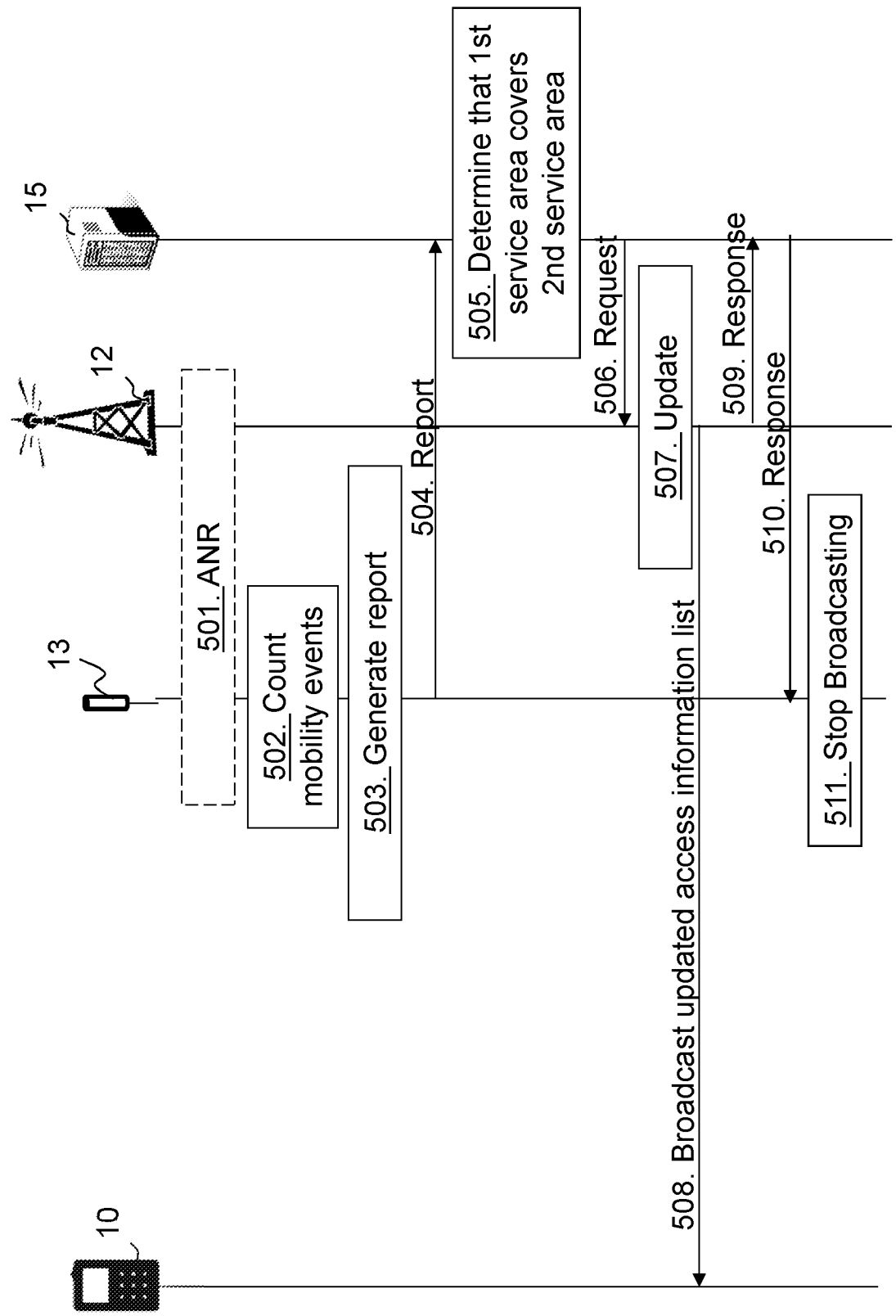
FIG. 5 is a combined signalling scheme and flowchart according to embodiments herein.

FIG. 5 is a combined flowchart and signalling scheme according to embodiments herein when the network node is exemplified as the managing node 15.

Action 501. The radio network node 13 and the access node 12 may have a configured neighbour relationship e.g. created by an automatic neighbour relationship process.

Action 502. The radio network node 13 may count mobility events for wireless devices to the access node 12 over a period of time. When a statically significant number, such as 95%, of the mobility events are performed to the access node 12 this is an indication that the first service area 11 covers the second service area 14. Hence, mobility events may be logged, triggered when wireless devices in active mode roam between service areas. These mobility events may be used by the radio network node 13 or be reported to the managing node 15 e.g. a central server such as the OSS.

Action 503. The radio network node 13 may then generate a report with information indicating how much the first service area 11 covers the second service area 14.

Action 504. The radio network node 13 transmits this report to the managing node 15.

Action 505. The managing node 15 determines that the first service area 11 covers the second service area 14 based on the received report from the radio network node 13 (and/or from the access node 12). Thus, based on mobility events reported (and/or measurements reported) by the radio network node 13 and/or the access node 12, the managing node 15, e.g. OSS node, may derive a relative number of times, also referred to statistically significant number, the first service area 11 is associated with the mobility events. Based on the derived relative number of times, the managing node 15 may request the access node 12 (associated with a high relative number of times) to take on the broadcast of the access information list from the radio network node 13, providing the SID information of the radio network node 13 comprising parameter(s) needed for network access. The access node 12 updates the access information list with the provided SID information and continues broadcasting the access information list with this newly added access information.

Action 506. The managing node 15 sends a request to the access node 12, requesting the access node 12 to broadcast the access information for the second service area 14. This request may comprise SID of the second service area 14 and other access information, such as identity of Public Land Mobile Network (PLMN), power settings, physical resource barring info etc., of the second service area 14.

Action 507. The access node 12 receiving the request may update its access information list when SID is not present in a current access information list.

Action 508. The access node 12 then broadcasts the updated access information list over the first service area 11.

Action 509. The access node 12 then confirms the broadcasting by sending a response such as a confirmation message to the managing node 15.

Action 510. The managing node 15 stops the broadcasting of the access information of the second service area 14 from the radio network node 13 by sending a response to the report from the radio network node 13 confirming that the access information is broadcast by the access node 12. For example, on a positive acknowledgement from the access node 12 the managing node 15 may request the radio network node 13 to cease its broadcast of the access information list.

Action 511. The radio network node 13 stops the broadcasting of the access information but continue to send the SID over the second service area 14. The wireless device 10 then receives the broadcasted information in the first service area 11 and then detects and receives e.g. SID of the second service area 14. The wireless device 10 may then access the second service area 14 based on the access information associated to the received SID in the access information list received from the access node 12.

Figure 6:
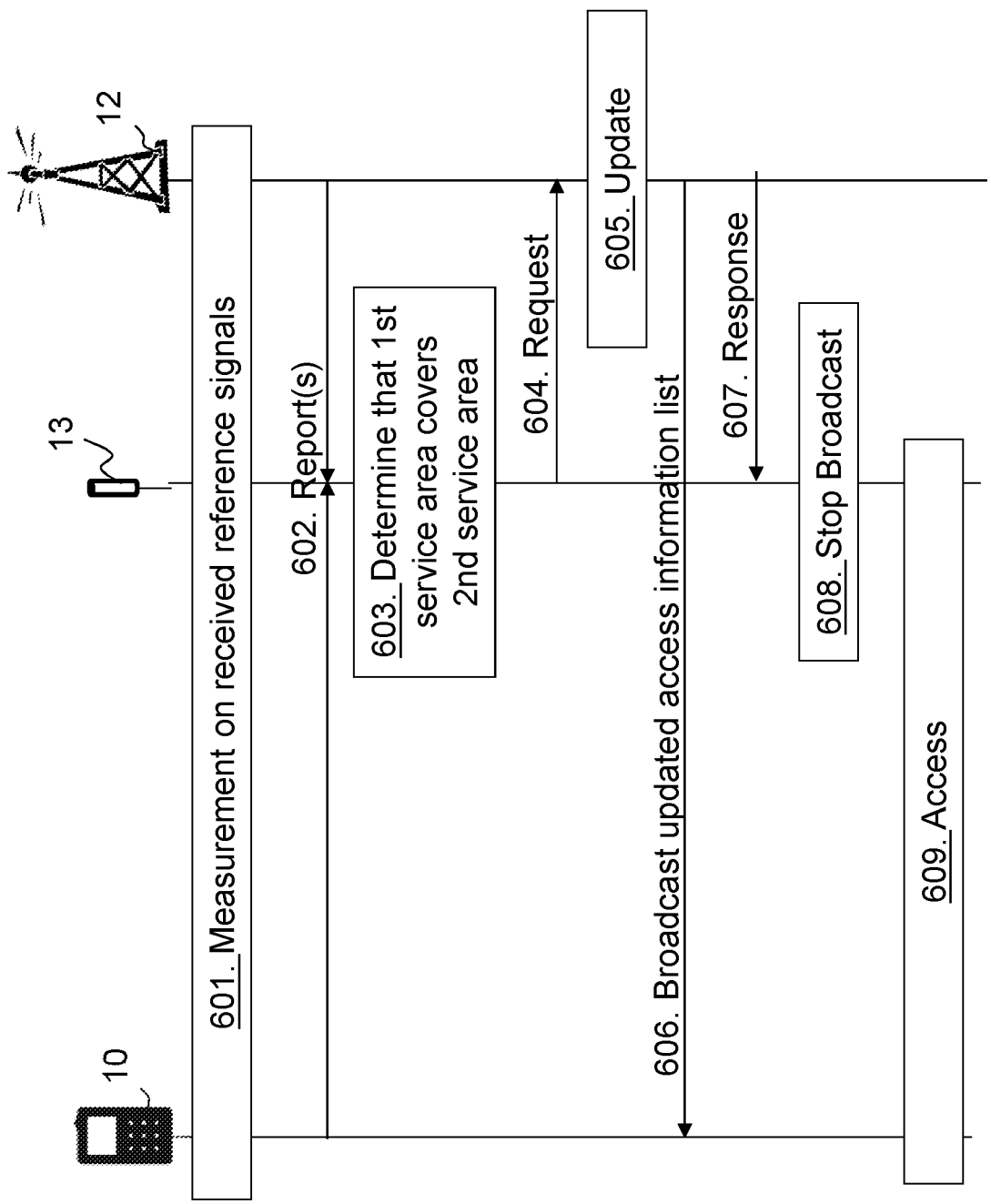
FIG. 6 is a combined signalling scheme and flowchart according to embodiments herein.

FIG. 6 is a combined flowchart and signalling scheme according to embodiments herein when the network node is exemplified as the radio network node 13. The system information to access the communication network is broadcasted in the access information list. Each antenna transmission point, or service area, broadcasts a SID providing a list entry into the access information list. The information associated with the SID in the access information list, denoted system ID info, contains information needed by the wireless device 10 to access the network node of the SID. The radio network node 13 and the access node 12 may have a configured neighbour relationship e.g. created by an automatic neighbour relationship process.

Action 601. The wireless device 10 and/or the access node 12 may perform some measurement on received reference signals.

The reference signal may be at least temporarily and locally unique for each service area, antenna transmission points, or beam, and may thus be used by measurements of the wireless device 10 to provide a reference signal identity and quality of the downlink reception. The radio network node 13 may periodically or on demand request neighboring radio nodes, such as the access node, to transmit a at least temporarily and locally unique reference signal on which wireless devices may measure and report reference signal identity and quality of the downlink reception. The reference signal may be unique per antenna beam or per antenna transmission point, or service area, and be transmitted over all antenna beams of the antenna transmission point, or service area, or a subset thereof. It should also be noted that when measuring on uplink signals, see action 403 above, the neighboring radio nodes, such as the access node 12, are periodically or on demand requested to measure on an at least temporarily and locally unique reference signal transmitted by the wireless device 10 in uplink, where the access node 12 would report reference signal identity and quality of the reception to the requesting radio network node 13, providing information of receiving in the first service area 11 and the receiving antenna point and/or beam within the receiving first service area 11. It should be noted that wireless device and network based measurements may also be used in combination.

Action 602. The wireless device 10 and/or the access node 12 may report the measurements to the radio network node 13.

Action 603. The radio network node 13 may, based on the received measurement reports (and/or the mobility events), determine that the first service area 11 covers the second service area 14. E.g. the radio network node 13 may determine that a relative number of times, also referred to statistically significant number, the first service area 11 is associated with the measurements or events. Especially the radio network node 13 of a smaller service area/antenna transmission point may determine that this is covered by a larger cell/antenna transmission points by a high relative number of times (above the event/UL/DL threshold).

Action 604. The radio network node 13 then transmits a request to the access node 12 requesting the access node 12 to broadcast the access information of the second service area 14. For example, based on the determined relative number of times, determined/measured/calculated in the radio network node 13, the radio network node 13 may request its neighbor radio nodes, such as the access node 12, associated with a high relative number of times above the event, UL, or DL threshold, to take on the broadcast of the access information list, providing information of an identity associated with the neighbor node, e.g. cell id of the first service area 11, and reference signals of the second service area 14.

Action 605. The access node 12 may update its access information list with the received SID and SID information if not already present in the access information list. If already present in the access information list the access node 12 merely continues to broadcast the present access information list.

Action 606. The access node 12 then broadcasts the updated access information list with the added SID and SID information. The access node broadcasting the access information list may e.g. be a 5G radio node or an evolved LTE radio node.

Action 607. The access node 12 then transmits a response confirming that the access node 12 broadcasts the access information of the second service area 14.

Action 608. The radio network node 13 receiving the confirmation may then stop or cease broadcasting the access information e.g. access information list with SID and SID information, over the second service area 14. For example, the requested access node 12 may update the access information list with the provided SID and SID information and continue broadcasting access information list with this newly added access information and on a positive acknowledgement the requesting radio network node 13 may cease its broadcast of the access information list.

Action 609. The wireless device 10 then receives the broadcasted information in the first service area 11 and then detects and receives e.g. SID of the second service area 14. The wireless device 10 may then access the second service area 14 based on the access information associated to the received SID in the access information list received from the access node 12.

Based on the determined relative number of times a radio network node 13 may alternatively in action 604 request the managing node 15, to request the access node 12 associated with a high determined relative number of times to take on the broadcast of the access information list, providing information of an identity associated with the access node 12, e.g. identity of the first service area 11, and the SID entry in the access information list comprising parameters needed for initial access transmission. The managing node 15 may in turn forward the request to the access node 12 based on e.g. the identity of the first service area 11. The requested access node 12 may update the access information list with the provided SID and SID information and continue broadcasting access information list with this newly added access information and on a positive acknowledgement the requesting radio network node 13 may cease its broadcast of the access information list. The managing node 15 may also update the access information list(s) accordingly. It should be noted that the lists doesn't necessarily need to be updated if the SID entry already exist in the access information list.

When the radio network node 13 is initially introduced, i.e. set-up, in the communication network 1, the radio network node 13 needs to be configured into the surrounding communication network 1. There are currently some ways of introducing a radio network node in the communication network, e.g. by a Manual configuration that requires additional manual work; or that the radio network node 13 has equipment that can scan the surrounding network and adapt. The radio network node 13 may be preconfigured to perform the measurements or configured from a central server in the communication network 1, e.g. the OSS node. The radio network node 13 may then obtain from e.g. the OSS, further information specific for the operator, network node type, and/or location of the radio network node.

Furthermore, one objective is to be power efficient and provide a low Total Cost of Ownership (TCO). To achieve this system information that is broadcasted in e.g. 5G or similar, is reduced and is broadcasted with longer periods of silence between each broadcasting. As stated above this causes problems since radio network nodes may initially be deployed as booster nodes, i.e. with a very spotty coverage, within the coverage of e.g. the access node 12. Also the radio network nodes may use higher frequencies and thus have a small coverage area. Hence, it may take time before the wireless device 10 detects the radio network node 13, and since the coverage area is small, a moving wireless device might not even detect the radio network node 13 at all. However, according to embodiments herein the access node 12, e.g. a LTE macro node, broadcasts system information for the second service area 14 enabling the wireless device 10 to easier access the radio network node 13 when detecting the second service area 14. According to embodiments herein the system information may be broadcasted as an Access Information list by access nodes of service areas covering other service area of other network nodes with SIDs providing list entries into the access information list. The Access Information list contains the information required by the wireless device 10 to access an antenna transmission point, or service area, transmitting a certain SID.

Embodiments herein provide an automated configuration of the transmission points for system information broadcasted, e.g. in an access information list, based on wireless device or network measurements, mobility events, or a combination thereof, in the communication network, resulting in a Self-Organizing Network (SON) function.

Figure 7:
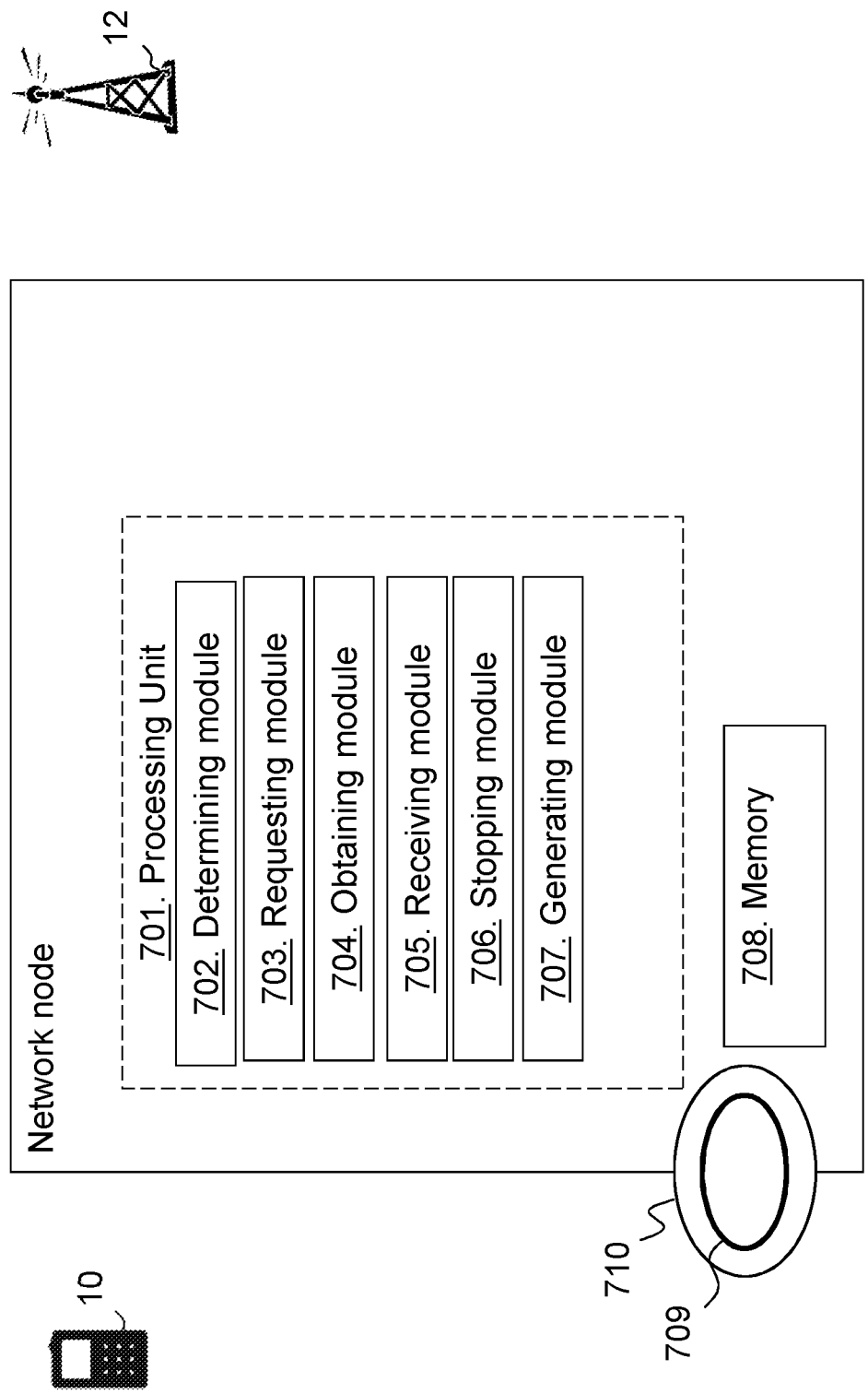
FIG. 7 is a block diagram depicting a network node according to embodiments herein.

FIG. 7 is a block diagram depicting the network node, exemplified herein as the radio network node 13 or the managing node 15, for handling communication in the communication network 1. The communication network 1 comprises the radio network node 13 providing radio coverage over the second service area 14 and the access node 12 providing radio coverage over the first service area 11. The network node may comprise a processing unit 701, one or more processors, configured to perform the methods herein.

The network node may comprise a determining module 702. The network node, the processing unit 701 and/or the determining module 702 may be configured to determine that the first service area 11 covers the second service area 14. The network node, the processing unit 701 and/or the determining module 702 may be configured to determine that the first service area 11 covers the second service area 14 when one or more conditions are fulfilled, which one or more conditions comprises one or more of:

when a statistically significant number of mobility events, in the second service area 14 to/from the first service area 11 is above the event threshold, when a statistically significant number of measurements of signals from one or more wireless devices in the second service area 14, received by the access node 12, is above the uplink threshold;

when a statistically significant number of measurements of signals from the access node 12, received by one or more wireless devices in the second service area 14, is above the downlink threshold e.g. when the statistically significant number of wireless devices within the second service area 14 have detected the first service area 11 is above the DL threshold.

The network node may comprise a requesting module 703. The network node, the processing unit 701 and/or the requesting module 703 may be configured, in the case the first service area 11 is determined to cover the second service area 14, to request the access node 12 to broadcast access information for the second service area 14.

The network node may comprise an obtaining module 704. The network node, the processing unit 701 and/or the obtaining module 704 may be configured to obtain information indicating that the first service area 11 covers the second service area 14. The network node, the processing unit 701 and/or the obtaining module 704 may be configured to obtain the information by being configured to measure signals and/or mobility events indicating how much the first service area 11 overlaps the second service area 14 from a traffic point of view. The network node, the processing unit 701 and/or the obtaining module 704 may be configured to obtain the information by being configured to receive one or more reports indicating how much the first service area 11 overlaps the second service area 14 from a traffic point of view. The network node, the processing unit 701 and/or the obtaining module 704 may be configured to obtain the information by being configured to transmit the first signalling request, to the access node 12, requesting the access node 12 to transmit an at least temporarily and locally unique reference signal over the first service area 11. The network node, the processing unit 701 and/or the obtaining module 704 may be configured to obtain the information by being configured to transmit the second signalling request, to the access node 12, requesting the access node 12 to measure on an at least temporarily and locally unique reference signal transmitted by the wireless device 10 in the second service area 14.

The network node may comprise a receiving module 705. The network node, the processing unit 701 and/or the receiving module 705 may be configured to receive the one or more reports from the radio network node 13 when the network node is the managing node 15, and from the managing node 15 when the network node is the radio network node 13.

The network node may comprise a stopping module 706. The network node, the processing unit 701 and/or the stopping module 706 may be configured to stop broadcasting the access information within the second service area 14 when receiving the indication of confirmation that the access node 12 is broadcasting the access information of the second service area 14.

The network node may comprise a generating module 707. The network node, the processing unit 701 and/or the generating module 707 may be configured to generate the report with information indicating how much the first service area 11 covers the second service area 14.

The network node further comprises a memory 708. The memory may comprise one or more memory units to be used to store data on, such as access information, SIDs, Cell IDs, measurements, reports, events, threshold, system information, applications to perform the methods disclosed herein when being executed, and similar.

The methods according to the embodiments described herein for the network node are respectively implemented by means of e.g. a computer program 709 or a computer program product, comprising instructions, i.e., software code portions, which, when executed on at least one processor, cause the at least one processor to carry out the actions described herein, as performed by the network node. The computer program 709 may be stored on a computer-readable storage medium 710, e.g. a disc or similar. The computer-readable storage medium 710, having stored thereon the computer program, may comprise the instructions which, when executed on at least one processor, cause the at least one processor to carry out the actions described herein, as performed by the network node. In some embodiments, the computer-readable storage medium may be a non-transitory computer-readable storage medium.

Figure 8:
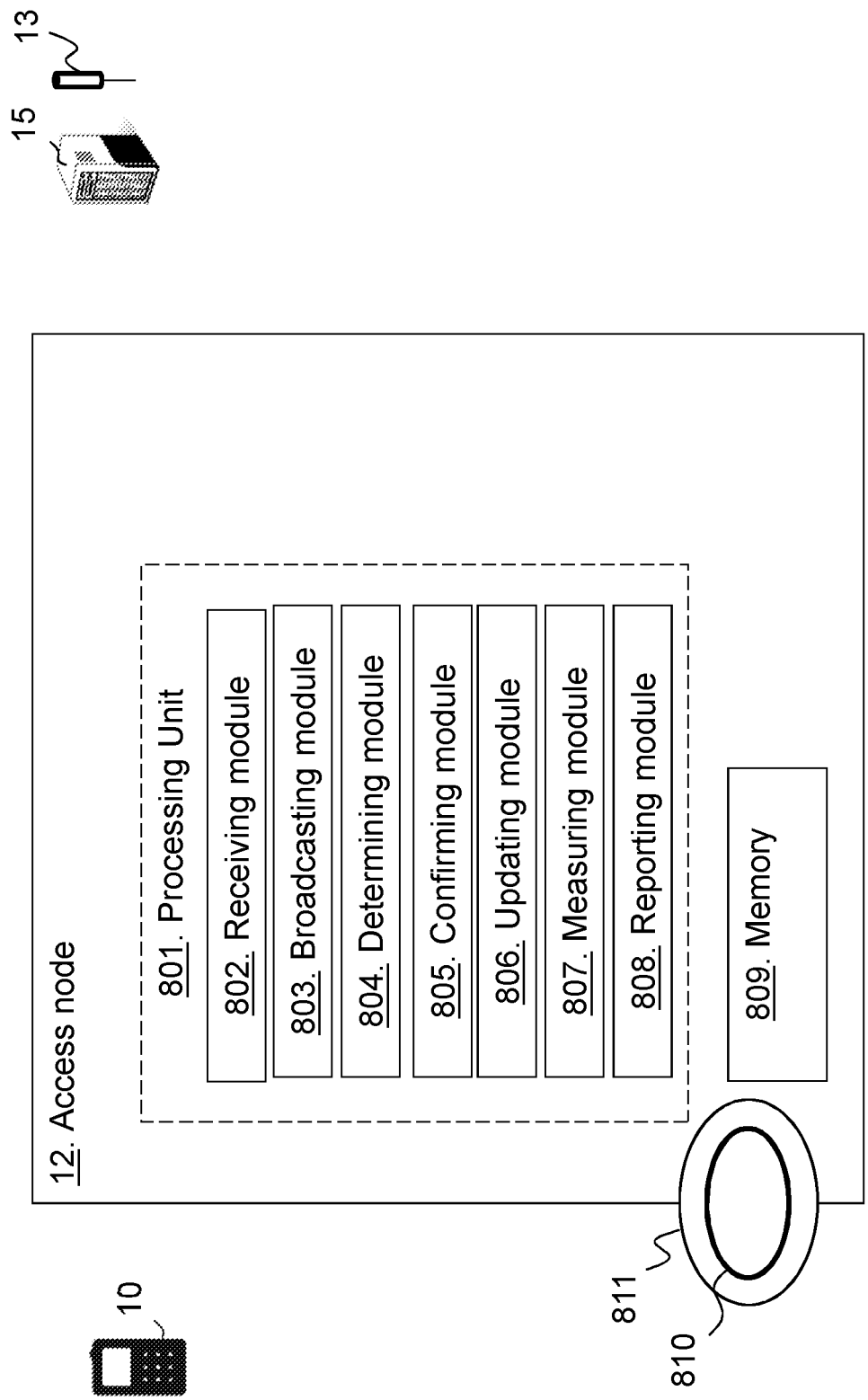
FIG. 8 is a block diagram depicting an access node according to embodiments herein.

FIG. 8 is a block diagram depicting the access node 12 for handling communication in the communication network 1. The communication network 1 comprises the radio network node 13 providing radio coverage over the second service area 14 and the access node 12 providing radio coverage over the first service area 11. The access node 12 may comprise a processing unit 801, one or more processors, configured to perform the methods herein.

The access node 12 may comprise a receiving module 802. The access node 12, the processing unit 801 and/or the receiving module 802 may be configured to receive the request, from the radio network node 13, requesting the access node 12 to broadcast access information for the second service area 14.

The access node 12 may comprise a broadcasting module 803. The access node 12, the processing unit 801 and/or the broadcasting module 803 may be configured to broadcast the access information for the second service area 14.

The access node 12 may comprise a determining module 804. The access node 12, the processing unit 801 and/or the determining module 804 may be configured to determine to broadcast the access information for the second service area 14.

The access node 12 may comprise a confirming module 805. The access node 12, the processing unit 801 and/or the confirming module 805 may be configured to confirm back to the radio network node 13 that the access node 12 transmits the access information for the second service area 14.

The access node 12 may comprise an updating module 806. The access node 12, the processing unit 801 and/or the updating module 806 may be configured to update an access information list with the access information of the second service area 14 and the access node 12, the processing unit 801 and/or the broadcasting module 803 may be configured to broadcast the updated access information list.

The access node 12, the processing unit 801 and/or the receiving module 802 may be configured to receive the first signaling request, from the radio network node 13, requesting the access node 12 to transmit an at least temporarily and locally unique reference signal. The access node 12, the processing unit 801 and/or the broadcasting module 803 may then be configured to broadcast the at least temporarily and locally unique reference signal over the first service area 11.

The access node 12, the processing unit 801 and/or the receiving module 802 may be configured to receive the second signaling request, from the radio network node 13, requesting the access node 12 to measure on an at least temporarily and locally unique reference signal transmitted by the wireless device 10 in the second service area 14. The access node 12 may comprise a measuring module 807. The access node 12, the processing unit 801 and/or the measuring module 807 may be configured to measure on the at least temporarily and locally unique reference signal. The access node 12 may comprise a reporting module 808. The access node 12, the processing unit 801 and/or the reporting module 808 may be configured to report the measurement report comprising result of the measurement.

The access node 12 further comprises a memory 809. The memory may comprise one or more memory units to be used to store data on, such as access information, SIDs, Cell IDs, measurements, reports, events, threshold, system information, applications to perform the methods disclosed herein when being executed, and similar.

The methods according to the embodiments described herein for the access node 12 are respectively implemented by means of e.g. a computer program 810 or a computer program product, comprising instructions, i.e., software code portions, which, when executed on at least one processor, cause the at least one processor to carry out the actions described herein, as performed by the access node 12. The computer program 810 may be stored on a computer-readable storage medium 811, e.g. a disc or similar. The computer-readable storage medium 811, having stored thereon the computer program, may comprise the instructions which, when executed on at least one processor, cause the at least one processor to carry out the actions described herein, as performed by the access node 12. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of an access node or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling communication in a communication network, the communication network comprises a radio network node providing radio coverage over a second service area and an access node providing radio coverage over a first service area, the method comprising:
   determining that the first service area covers the second service area; and
   in response to determining that the first service area covers the second service area, requesting the access node to broadcast access information for the second service area from the access node, wherein the access node, in response to the requesting, to update an access information list of the access node to include the access information for the second service area and to broadcast access information included in the access information list, and wherein a wireless device covered by the first and second service areas to receive the access information included in the access information list broadcasted from the access node, in order to access the second service area without the radio network node broadcasting the access information for the second service area.

2. The method according to claim 1, wherein the determining that the first service area covers the second service area comprises fulfilling one or more conditions of:
   when a statistically significant number of mobility events, in the second service area to or from the first service area is above an event threshold;
   when a statistically significant number of measurements of signals from one or more wireless devices in the second service area, received by the access node, is above an uplink threshold; and
   when a statistically significant number of measurements of signals from the access node, received by one or more wireless devices in the second service area, is above a downlink threshold.

3. The method according to claim 1, further comprising obtaining information indicating that the first service area covers the second service area.

4. The method according to claim 3, wherein the obtaining comprises measuring signals or mobility events indicating how much the first service area overlaps the second service area from a traffic point of view.

5. The method according to claim 3, wherein the obtaining comprises receiving one or more reports indicating how much the first service area overlaps the second service area from a traffic point of view.

6. The method according to claim 5, wherein the one or more reports are received from the radio network node, when the network node is a managing node.

7. The method according to claim 3, wherein the obtaining comprises transmitting a first signalling request, to the access node, requesting the access node to transmit an at least temporarily and locally unique reference signal over the first service area.

8. The method according to claim 3, wherein the obtaining comprises transmitting a second signalling request, to the access node, requesting the access node to measure on an at least temporarily and locally unique reference signal transmitted by a wireless device in the second service area.

9. The method according to claim 1, further comprising stopping broadcasting the access information within the second service area, when receiving an indication of confirmation that the access node is broadcasting the access information of the second service area.

10. The method according to claim 1, further comprising generating a report with information indicating how much the first service area covers the second service area.

11. A method performed by an access node for handling communication in a communication network, the communication network comprises a radio network node providing radio coverage over a second service area and the access node providing radio coverage over a first service area, the method comprising:
    receiving a request, from the radio network node, requesting the access node to broadcast access information for the second service area, the request in response to a determination that the first service area covers the second service area; and
    in response to receiving the request, updating an access information list of the access node to include the access information for the second service area and broadcasting the access information included in the access information list from the access node, wherein a wireless device covered by the first and second service areas to receive the access information included in the access information list broadcasted from the access node, in order to access the second service area without the radio network node broadcasting the access information for the second service area.

12. The method according to claim 11, further comprising:

determining to broadcast the access information for the second service area, and confirming back to the radio network node that the access node transmits the access information for the second service area.

13. The method according to claim 11, further comprising:

updating an access information list with the access information of the second service area; and the broadcasting comprises broadcasting the updated access information list.

14. The method according to claim 11, further comprising:

receiving a first signaling request, from the radio network node, requesting the access node to transmit an at least temporarily and locally unique reference signal; and broadcasting the at least temporarily and locally unique reference signal over the first service area.

15. The method according to claim 11, further comprising:

receiving a second signaling request, from the radio network node, requesting the access node to measure on an at least temporarily and locally unique reference signal transmitted by a wireless device in the second service area;

measuring on the at least temporarily and locally unique reference signal; and reporting a measurement report comprising result of the measuring.

16. A network node for handling communication in a communication network, the communication network comprises a radio network node providing radio coverage over a second service area and an access node providing radio coverage over a first service area, the network node comprising:

a processor; and a memory containing instructions which, when executed by the processor, cause the network node to perform operations to:

determine that the first service area covers the second service area; and in response to a determination that the first service area covers the second service area, request the access node to broadcast access information for the second service area from the access node, wherein the access node, in response to the request, to update an access information list of the access node to include the access information for the second service area and to broadcast access information included in the access information list, and wherein a wireless device covered by the first and second service areas to receive the access information included in the access information list broadcasted from the access node, in order to access the second service area without the radio network node broadcasting the access information for the second service area.

17. The network node according to claim 16, wherein to determine that the first service area covers the second service area, the network node to perform operations to fulfill one or more conditions of:

when a statistically significant number of mobility events, in the second service area to or from the first service area is above an event threshold, when a statistically significant number of measurements of signals from one or more wireless devices in the second service area, received by the access node, is above an uplink threshold; and when a statistically significant number of measurements of signals from the access node, received by one or more wireless devices in the second service area, is above a downlink threshold.

18. The network node according to claim 16, further to perform operations to:

obtain information indicating that the first service area covers the second service area.

19. The network node according to claim 18, wherein to obtain the information, the network node to perform operations to measure signals or mobility events indicating how much the first service area overlaps the second service area from a traffic point of view.

20. The network node according to claim 18, wherein to obtain the information, the network node to perform operations to receive one or more reports indicating how much the first service area overlaps the second service area from a traffic point of view.

21. The network node according to claim 20, wherein the network node to receive the one or more reports from the radio network node, when the network node is a managing node.

22. The network node according to claim 18, wherein to obtain the information, the network node to perform operations to transmit a first signalling request, to the access node, requesting the access node to transmit an at least temporarily and locally unique reference signal over the first service area.

23. The network node according to claim 18, wherein to obtain the information, the network node to perform operations to transmit a second signalling request, to the access node, requesting the access node to measure on an at least temporarily and locally unique reference signal transmitted by a wireless device in the second service area.

24. The network node according to claim 16, further to perform operations to stop broadcasting the access information within the second service area, when receiving an indication of confirmation that the access node is broadcasting the access information of the second service area.

25. The network node according to claim 16, further to perform operations to generate a report with information indicating how much the first service area covers the second service area.

26. An access node for handling communication in a communication network, the communication network comprises a radio network node providing radio coverage over a second service area and the access node providing radio coverage over a first service area, the access node comprising:

a processor;

a memory containing instructions which, when executed by the processor, cause the access node to perform operations to:

receive a request, from the radio network node, requesting the access node to broadcast access information for the second service area, the request in response to a determination that the first service area covers the second service area; and in response to receiving the request, update an access information list of the access node to include the access information for the second service area and broadcast the access information included in the access information list from the access node, wherein a wireless device covered by the first and second service areas to receive the access information included in the access information list broadcasted from the access node, in order to access the second service area without the radio network node broadcasting the access information for the second service area.

27. The access node according to claim 26, further to perform operations to:
    determine to broadcast the access information for the second service area; and
    confirm back to the radio network node that the access node transmits the access information for the second service area.

28. The access node according to claim 26, further to perform operations to:
    update an access information list with the access information of the second service area; and
    broadcast the updated access information list.

29. The access node according to claim 26, further to perform operations to:
    receive a first signaling request, from the radio network node, requesting the access node to transmit an at least temporarily and locally unique reference signal; and
    broadcast the at least temporarily and locally unique reference signal over the first service area.

30. The access node according to claim 26, further to perform operations to:
    receive a second signaling request, from the radio network node, requesting the access node to measure on an at least temporarily and locally unique reference signal transmitted by a wireless device in the second service area;
    measure on the at least temporarily and locally unique reference signal; and
    report a measurement report comprising result of the measurement.

31. A non-transitory computer-readable storage medium, having stored thereon a computer program comprising instructions, which, when executed on at least one processor, cause a network node for handling communication in a communication network, in which the communication network comprises a radio network node providing radio coverage over a second service area and an access node providing radio coverage over a first service area, to perform operations comprising:
    determining that the first service area covers the second service area;
    in response to determining that the first service area covers the second service area, requesting the access node to broadcast access information for the second service area from the access node, wherein the access node, in response to the requesting, to update an access information list of the access node to include the access information for the second service area and to broadcast access information included in the access information list, and wherein a wireless device covered by the first and second service areas to receive the access information included in the access information list broadcasted from the access node, in order to access the second service area without the radio network node broadcasting the access information for the second service area.

32. A non-transitory computer-readable storage medium, having stored thereon a computer program comprising instructions which, when executed on at least one processor, cause an access node for handling communication in a communication network, in which the communication network comprises a radio network node providing radio coverage over a second service area and the access node providing radio coverage over a first service area, to perform operations comprising:
    receiving a request, from the radio network node, requesting the access node to broadcast access information for the second service area, the request in response to a determination that the first service area covers the second service area; and
    in response to receiving the request, updating an access information list of the access node to include the access information for the second service area and broadcasting the access information included in the access information list from the access node, wherein a wireless device covered by the first and second service areas to receive the access information included in the access information list broadcasted from the access node, in order to access the second service area without the radio network node broadcasting the access information for the second service area.

* * * * *